Feb. 16, 1965   K. BREER ETAL   3,169,833
APPARATUS FOR MIXING LIQUIDS
Filed Aug. 12, 1957

INVENTORS:
KARL BREER, ERWIN WEINBRENNER, PETER HOPPE.
BY
Clelle W. Upchurch
ATTORNEY

United States Patent Office 3,169,833
Patented Feb. 16, 1965

3,169,833
APPARATUS FOR MIXING LIQUIDS
Karl Breer, Cologne-Flittard, Erwin Weinbrenner, Leverkusen, and Peter Hoppe, Troisdorf, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
Filed Aug. 12, 1957, Ser. No. 677,676
Claims priority, application Germany, Aug. 23, 1956, F 21,080
5 Claims. (Cl. 23—252)

This invention relates generally to an apparatus for mixing liquids and, more particularly, to an apparatus and process for mixing a viscous liquid with other less viscous liquids to form a polyurethane plastic.

In the apparatuses heretofore available for mixing the components of a polyurethane plastic together, the more viscous organic compound having at least two reactive hydrogen atoms is usually mixed with the other less viscous materials, such as, for example, an organic polyisocyanate and a catalyst, by injecting the latter materials into a stream of the more viscous material. The more viscous organic compound having at least two reactive hydrogen atoms is pumped into a suitable mixing chamber and the other less viscous materials are injected into the stream of the more viscous liquid. These mixing devices are sometimes provided with a stirrer to further mix the components together and to insure a reaction mixture of substantially uniform composition under even the most advantageous conditions. Although this type of mixer has been widely accepted and provides a reaction mixture of substantially uniform composition in most instances, sometimes complete mixing is not obtained, particularly in small mixing chambers and in mixing devices adapted for use as a spray gun or hand pouring device, unless other means are provided for supplementing the mixing brought about by injecting a stream of one component into the others.

It is therefore an object of this invention to provide an improved device for mixing the liquid components of a plastic together. Another object of the invention is to provide a novel means for mixing a relatively viscous liquid with liquids of less viscosity. Still another object of the invention is to provide an improved method and apparatus for mixing the components of a polyurethane plastic. A further object of the invention is to provide a process and apparatus for mixing the components of a polyurethane plastic which can be used to advantage as a hand spraying device or hand pouring device.

Other objects will become apparent from the following description with reference to the accompanying drawing in which.

The foregoing objects as well as others are accomplished in accordance with this invention, generally speaking, by providing an apparatus for mixing liquids having a valve with a stem which extends into a mixing chamber and seats against the side wall of the mixing chamber, the stem terminating in a blunt end and at least one injection nozzle spaced from the valve stem and adapted to inject a liquid into the mixing chamber and against the surface of the blunt end of the valve stem. In accordance with this invention, substantially instantaneous and complete mixing of the less viscous components of a polyurethane plastic with the more viscous organic compound having at least two reactive hydrogen atoms is achieved by injecting the less viscous components into the mixing chamber under a pressure greater than the pressure in the mixing chamber and against the end of the valve stem in the inlet through which the organic compound having at least two reactive hydrogen atoms is introduced. The organic compound having at least two reactive hydrogen atoms or other viscous liquid is pumped into the chamber around the end of the valve stem and thus enters the mixing chamber in the form of a hollow cylindrical or conically shaped body of liquid. The organic polyisocyanate or other less viscous component of the polyurethane plastic is injected into the chamber and against the end of the valve stem and within the cylindrical body of the more viscous liquid. The less viscous liquid impinges on the surface of the end of the valve stem and is broken up into a spray which travels at a high velocity into the cylindrical body of liquid, thereby providing for substantially instantaneous intimate mixing of the less viscous liquid with the more viscous liquid.

The end of the valve stem serves as a baffle and the surface may be flat, but best mixing is obtained if the end of the valve stem is curved, i.e., either convex or concave. It has proved to be particularly advantageous to provide a baffle member having a deflecting surface about 4 mm. in diameter when the injection nozzle has an opening of about 2 mm. in diameter and the baffle member, when the valve is in open position, is from about 1 to about 5 mm. from the nozzle. Best results are obtained in a device of this size when the baffle member is spaced from the orifice of the injection nozzle only about 1 mm.

Figure 1:
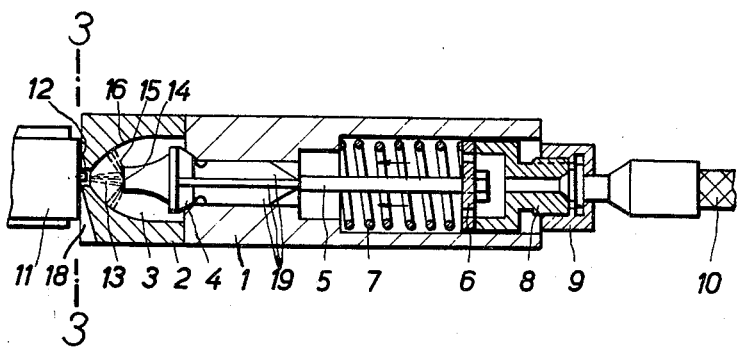
FIGURE 1 is a longitudinal sectional view of an embodiment of the invention showing an inlet valve in closed position.

Referring now to the drawing, an embodiment of the invention is shown in a longitudinal sectional view in FIGURE 1. The mixing apparatus is provided with a valve housing 1 and a housing 2 about a mixing chamber 3, Valve stem 5 extends through housing 1 and terminates in an enlarged end portion 4 which serves as a baffle as will be explained later. It will be noted that in this embodiment the enlarged portion 4 terminates in a concave surface. Valve stem 5 is provided with guide fins 19 and a nut 6 threadably mounted on stem 5. Spring 7 moves as nut 6 is turned, thereby regulating the pressure required to open the valve by unseating end portion 4. Valve housing 1 is connected by an attachment 8 and a locking nut 9 to a flexible pipe 10 through which the organic compound having at least two reactive hydrogen atoms is supplied under pressure by means of a pump or other suitable means. Preferably, the pressure on the organic compound having at least two reactive hydrogen atoms is about 50 atmospheres gauge pressure. Spaced from the curved surface of the end 4 of valve stem 5 is an injection nozzle 11 extending through housing 2. A second component, such as an organic polyisocyanate, is injected under a pressure greater than that in the chamber through bore 12 in housing 2 into chamber 3. Preferably, the pressure on the component injected through nozzle 11 is about 200 atmospheres gauge pressure and the frequency of injection is preferably not more than about 20,000 injections per minute. Any suitable pump may be used for injecting the component through nozzle 11. The injected stream 13 impinges on the curved baffle surface 14 of the valve stem 4 and is deflected in the form of a dish-shaped spray 15 into the surrounding organic compound having at least two reactive hydrogen atoms and against the inside wall 16 of mixing chamber 3.

Figure 2:
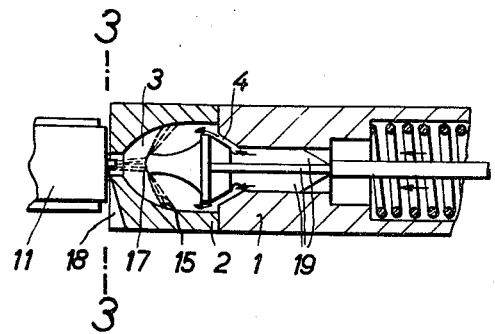
FIGURE 2 is a fragmentary longitudinal sectional view of another embodiment of the invention showing the valve in open position.
Figure 3:
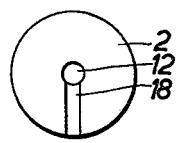
FIGURE 3 is a cross-section taken along the lines a—b of FIGURE 2.

In the embodiment shown in FIGURE 2, the valve is open with the end 4 of valve stem 5 being spaced from the valve seat in housing 1. The baffle surface 17 on valve stem 4 has a convex curvature. Any amount of curvature on the surface of the end portion of valve stem 5 may be used whether the curved surface is convex or concave. The stream of the main component, that is, the organic compound having at least two reactive hydrogen atoms, flows along the outside of valve stem end 4 in the direction of the arrows and forms a hollow jet which is permeated by the spray 15 of the secondary component injected through nozzle 11, thereby achieving substantially instantaneous and intimate mixing in chamber 3. The mixture leaves the mixing chamber 3 by way of the outlet slot 18 which is wedge-shaped and is connected to the injection bore 12 of nozzle 11, thereby insuring that some of the injected component travels through the mixture before it strikes baffle surface 14.

It is to be understood that the apparatus provided by this invention may be used in mixing any two liquids together, but it is particularly well suited for mixing the components of a polyurethane plastic. The apparatus is adaptable for mixing any components of a polyurethane plastic together. The more viscous liquid may be any suitable organic compound having at least two reactive hydrogen atoms and a molecular weight of at least 500, such as, for example, a polyester prepared by condensing a polycarboxylic acid with a polyhydric alcohol, a polyalkylene ether glycol prepared by polymerizing an alkylene oxide, a polythioether glycol prepared by polymerizing a thioglycol or by condensing a thioglycol with a glycol, or a polyester amide. The more viscous liquid may also be a prepolymer or adduct prepared by reacting one of the foregoing organic compounds having at least two reactive hydrogen atoms with an organic polyisocyanate under substantially anhydrous conditions to form a product having terminal NCO groups. The organic compound having at least two reactive hydrogen atoms should preferably have a hydroxyl number of between 25 and 500. The acid number of the polyester should preferably not be more than about 2.

In practicing the invention, a suitable activator mixture containing a catalyst may be injected into the stream of organic compound having at least two reactive hydrogen atoms or prepolymer as described above, but preferably the activator mixture or catalyst is mixed with the more viscous liquid in a separate mixer and the resulting mixture is then pumped into mixing chamber 3 through the opening about valve stem 4. An organic polyisocyanate is then injected through nozzle 11 into the mixed stream of organic compound having at least two reactive hydrogen atoms and activator mixture. If a prepolymer is used, the prepolymer may contain an unreacted organic polyisocyanate and a suitable activator mixture may be injected through nozzle 11 into a stream of that mixture.

Any suitable organic polyisocyanate, such as those disclosed in U.S. Patent 2,764,565, including 2,4-toluylene diisocyanate, 1,5-naphthylene diisocyanate, and metaphenylene diisocyanate, may be used. The activator mixture may contain water, a glycol, or any other suitable cross-linking agent and a catalyst, such as a tertiary amine. Suitable cross-linking agents and catalysts are disclosed in the aforesaid patent. The polyester or other organic compound having at least two reactive hydrogen atoms may be prepared in accordance with the method described in the Hoppe et al. patent.

Although some mixing will be achieved by injecting the organic polyisocyanate and/or catalyst into the mixing chamber and against the surface of the valve stem end at any injection pressure above the pressure in the mixing chamber, it is preferred to use a pressure substantially above that in the mixing chamber. For this reason, it is preferred to use an injection pressure of at least about 50 to 75 pounds per square inch above the back pressure in the mixing chamber.

In order better to describe and further clarify the invention, the following are specific examples of the process using the apparatus provided herein:

*Example 1*

About 100 parts by volume of a polyester prepared from 16 mols adipic acid, 16 mols diethylene glycol and 1 mol trimethylolpropane, are mixed with about 6.2 parts by volume of an activator mixture containing about 3 parts adipic acid ester of N-diethylaminoethanol, about 2 parts ammonium oleate and 1.2 parts water. This mixture is pumped into mixing chamber 3 around valve stem end 4. About 25 parts 2,4-toluylene diisocyanate are injected through nozzle 11 against baffle 14 and are deflected as a spray against the inner wall of the hollow spray entering around valve stem 4. The pressure on the toluylene diisocyanate is about 200 atmospheres gauge pressure and the pressure on the mixture entering around valve stem 4 is about 50 atmospheres gauge pressure. The component entering through nozzle 11 is intimately mixed with the mixture entering around valve stem 4 and is discharged through slot 18. Chemical reaction then proceeds between the components and a cellular polyurethane plastic is formed.

*Example 2*

About 100 parts by volume of a polythioether prepared from 1 mol of thiodiglycol and 1 mol of butane dioxethyl glycol are mixed with about 7.5 parts by volume of an activator mixture containing 1.2 parts of dimethyl benzylamine, 1.5 parts of diethyl ammonium oleate, 2 parts of sulfonated castor oil containing 54% of water, 2.5 parts of water and 0.3 part of paraffin oil. This mixture is pumped into mixing chamber 3 around valve stem end 4. About 38.5 parts of toluylene diisocyanate are injected through nozzle 11 against baffle 14 and are deflected as a spray against the inner wall of the hollow spray entering around valve stem 4. The pressure on the toluylene diisocyanate is about 180 atm. gauge pressure and the pressure on the mixture entering around valve stem 4 is about 50 atm. gauge pressure. The component entering through nozzle 11 is intimately mixed with a mixture entering around valve stem 4 and is discharged through slot 18. Chemical reaction then proceeds between the components and a smooth cellular polyurethane plastic is formed.

*Example 3*

About 100 parts by weight of polybutylene glycol (OH number about 58) are mixed with about 3% by weight of water, 1 part of dimethyl amine oleate and 4 parts by weight of bis-(diethylamino ethanol)-adipate. This mixture is pumped into mixing chamber 3 around valve stem end 4. About 44 parts by weight of toluylene diisocyanate are injected through nozzle 11 against baffle 14 and are deflected as a spray against the inner wall of the hollow spray entering around valve stem 4. The pressure on the toluylene diisocyanate is about 220 atm. gauge pressure and the pressure on the mixture entering around valve stem 4 is about 60 atm. gauge pressure. The component entering through nozzle 11 is intimately mixed with the mixture entering around valve stem 4 and is discharged through slot 18. After chemical reaction between the components an elastomeric sponge of high resiliency is formed.

As indicated hereinbefore, the end of the valve stem which serves as a baffle may be substantially flat, but a curved surface, either concave or convex, is much preferred because such a surface breaks up the stream of the less viscous component better and provides for better mixing of this component with the more viscous organic compound having at least two reactive hydrogen atoms or prepolymer.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. An apparatus for mixing liquids comprising a mixing chamber having walls, said chamber walls having an opening therein, a valve comprising a stem, a seating surface and a blunt end, said seating surface being movably disposed to open and close said opening, said blunt end projecting into said chamber, said chamber walls having a discharge opening opposite said blunt end, and an injection nozzle aligned with said discharge opening and said blunt end, said injection nozzle adapted to inject liquid under pressure through said discharge opening and against said blunt end.

2. The apparatus of claim 1 wherein said blunt end has a curved surface.

3. The apparatus of claim 2 wherein said curved surface is convex.

4. The apparatus of claim 2 wherein said curved surface is concave.

5. An apparatus for mixing liquids comprising a mixing chamber having walls, said chamber walls having an opening therein, a valve comprising a stem, a seating surface and a blunt end, said seating surface being movably disposed to open and close said opening, said blunt end projecting into said chamber, a discharge outlet comprising a discharge opening in the wall of said chamber opposite said blunt end and a discharge conduit communicating with said opening to convey the mixed components away from said chamber, an injection nozzle aligned with said discharge opening and said blunt end, said injection nozzle adapted to inject liquid under pressure through said discharge opening and against said blunt end.

References Cited in the file of this patent
UNITED STATES PATENTS

| | | |
|---|---|---|
| 1,089,033 | Arthur | Mar. 3, 1914 |
| 2,307,509 | Joachim | Jan. 5, 1943 |
| 2,364,987 | Lee | Dec. 12, 1944 |
| 2,669,437 | Geeraert | Feb. 16, 1954 |
| 2,764,565 | Hoppe et al. | Sept. 25, 1956 |
| 2,815,269 | Saunders et al. | Dec. 3, 1957 |
| 2,868,739 | Nischk | Jan. 13, 1959 |

FOREIGN PATENTS

| | | |
|---|---|---|
| 648,289 | Germany | July 27, 1937 |
| 14,600 | Great Britain | June 17, 1914 |